(12) United States Patent
Miyamoto et al.

(10) Patent No.: US 6,331,591 B1
(45) Date of Patent: Dec. 18, 2001

(54) CYCLOOLEFIN COPOLYMER RESIN COMPOSITION AND PROCESS FOR PREPARING THE SAME

(75) Inventors: Masahiro Miyamoto, Kobe; Katsuhiko Kimura, Akashi; Taizo Aoyama, Takasago, all of (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/424,360

(22) PCT Filed: Jun. 30, 1998

(86) PCT No.: PCT/JP98/02913

§ 371 Date: Nov. 23, 1999

§ 102(e) Date: Nov. 23, 1999

(87) PCT Pub. No.: WO99/01506

PCT Pub. Date: Jan. 14, 1999

(30) Foreign Application Priority Data

Jul. 2, 1997 (JP) .................................................. 9-193199

(51) Int. Cl.⁷ .................................................. C08G 63/48
(52) U.S. Cl. .............................................................. 525/70
(58) Field of Search .................................. 525/70, 75, 87

(56) References Cited

FOREIGN PATENT DOCUMENTS

| | | |
|---|---|---|
| 0 761 752 | 3/1997 | (EP) . |
| 7-196885 | 8/1995 | (JP) . |
| 8-113676 | 5/1996 | (JP) . |
| 8-134310 | 5/1996 | (JP) . |
| WO 97 46617 A | 12/1997 | (WO) . |

*Primary Examiner*—Terressa M. Boykin
(74) *Attorney, Agent, or Firm*—Armstrong, Westerman, Hattori, McLeland & Naughton, LLP

(57) ABSTRACT

A cycloolefin copolymer resin composition having well-balanced transparency and impact resistance which comprises (A) a cycloolefin copolymer and (B) 1 to 100 parts by weight, per 100 parts by weight of said cycloolefin copolymer, of at least one rubber-like polymer selected from the group consisting of (B1) an aromatic vinyl-isobutylene copolymer and (B2) an aromatic vinyl-conjugated diene copolymer, wherein the difference in refractive index (nD) at 20° C. between the components (A) and (B) is at most 0.015 and the particle size of the component (B) dispersed in the component (A) is from 0.4 to 3 μm. The composition may further contain a core-shell polymer (C), whereby the impact resistance can be further improved. The composition is prepared by kneading the above components at an elevated temperature optionally in the presence of an organic peroxide.

10 Claims, No Drawings

CYCLOOLEFIN COPOLYMER RESIN COMPOSITION AND PROCESS FOR PREPARING THE SAME

TECHNICAL FIELD

The present invention relates to a cycloolefin copolymer resin composition having well-balanced transparency and impact resistance and a process for preparing the composition.

BACKGROUND ART

Cycloolefin copolymers have excellent moldability, dimensional stability, transparency and moisture barrier. However, the impact strength thereof is not sufficient and, therefore, improvement thereof has been conventionally investigated. It has been demanded to further improve the impact resistance with maintaining an excellent transparency that the cycloolefin copolymers possess.

It is generally known that alloying transparent brittle thermoplastic resins with incompatible rubber components enhances the impact resistance. This manner is also effective for cycloolefin copolymers. For example, a cycloolefin copolymer composition reinforced with commercially available block copolymers (such as SBS, SEBS and SIS) as a rubber component is disclosed in Japanese Patent Publication Kokai No. 1-256548.

In general, the impact resistance and the transparency of alloys of polymers incompatible with each other are greatly influenced by phase morphology of components constituting the polymer alloys.

Impact resistance of brittle thermoplastic resins cannot be always improved by merely alloying with rubber components. It is known that revelation of impact resistance is influenced by domain size of the rubber components dispersed in the continuous phase of the brittle thermoplastic resins, and the domain size appropriate for the revelation of impact resistance varies for every thermoplastic resin.

In many cases, the refractive indexes of a thermoplastic resin and a rubber component do not completely agree all over the visible ray band, so an excellent transparency that brittle thermoplastic resins possess is not always prevented from lowering by merely matching the refractive indexes of components constituting a polymer alloy. Therefore, the transparency of a polymer alloy is swayed by determination of the wave length at which the refractive indexes should be matched or determination of the domain size to be formed of the rubber component.

Objects of the present invention are to provide a cycloolefin copolymer resin composition having well-balanced impact resistance and transparency, and a process for preparing the composition

DISCLOSURE OF THE INVENTION

In accordance with the first embodiment of the present invention, there is provided a transparent cycloolefin copolymer resin composition comprising (A) a cycloolefin copolymer and (B) 1 to 100 parts by weight, per 100 parts by weight of said cycloolefin copolymer, of at least one rubber-like polymer selected from the group consisting of (B1) an aromatic vinyl-isobutylene copolymer and (B2) an aromatic vinyl-conjugated diene copolymer, wherein the difference in refractive index (nD) at 20° C. between the components (A) and (B) is at most 0.015 and the particle size of the component (B) dispersed in the component (A) is from 0.4 to 3 μm.

In accordance with the second embodiment of the present invention, there is provided a resin composition wherein the above-mentioned resin composition of the first embodiment is further incorporated with (C) 1 to 80 parts by weight, per 100 parts by weight of the component (A), of a core-shell polymer, the difference in refractive index (nD) at 20° C. between the components (A) and (C) is at most 0.015, and the particle size of the primary particles of the component (C) is from 0.1 to 1.0 μm.

In accordance with the third embodiment of the present invention, there is provided a process for preparing a transparent cycloolefin copolymer resin composition which comprises kneading (A) a cycloolefin copolymer and (B) 1 to 100 parts by weight, per 100 parts by weight of said cycloolefin copolymer, of at least one rubber-like polymer selected from the group consisting of (B1) an aromatic vinyl-isobutylene copolymer and (B2) an aromatic vinyl-conjugated diene copolymer in the presence of (D) 0.0001 to 6 parts by weight, per 100 parts by weight of the component (A), of an organic peroxide at a temperature of 180 to 300° C.

In the above process, the components (A) and (B) may be kneaded together with (C) 1 to 80 parts by weight, per 100 parts by weight of the component (A), of a core-shell polymer.

BEST MODE FOR CARRYING OUT THE INVENTION

The cycloolefin copolymers (hereinafter referred to as "COC") used in the present invention are amorphous polymers having a cyclic olefin structure, and preferably have a glass transition temperature of 50 to 250° C., especially 80 to 200° C., more especially 80 to 160° C. If the glass transition temperature is less than 50° C., the rigidity is not sufficient and, therefore, a balance between rigidity and impact resistance is deteriorated. If the glass transition temperature is more than 250° C., the processability is lowered. Preferably, the COC used in the present invention comprises, based on the total weight thereof, 1 to 99% by weight of at least one cyclic olefin, preferably a cyclic olefin of the formula (I), (II), (III), (IV), (V), (VI) or (VII) described below, wherein $R^1$ to $R^8$ are the same or different and each is hydrogen atom or a hydrocarbon group having 1 to 20 carbon atoms, provided that at least two of $R^1$ to $R^8$ may form a ring, and n in the formula (VII) is an integer of 2 to 10, 99 to 1% by weight of at least one non-cyclic olefin, preferably a non-cyclic olefin of the formula (VIII) described below, wherein $R^9$ to $R^{12}$ are the same or different and each is hydrogen atom or a hydrocarbon group having 1 to 20 carbon atoms, and 0 to 20% by weight of other vinyl compounds having at least one double bond, e.g., (meth)acrylic acid, alkyl (meth)acrylate, (meth)acrylonitrile and vinyl acetate. More preferably, the COC used in the present invention comprises 40 to 90% by weight of at least one of cyclic olefins of the formulas (I) to (VII) and 60 to 10% by weight of a non-cyclic olefin of the formula (VIII).

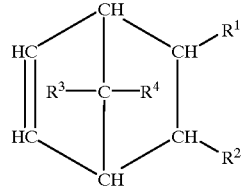

(I)

-continued

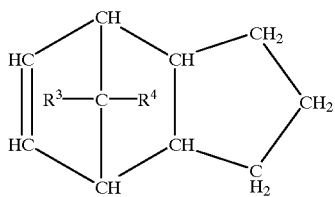
(II)

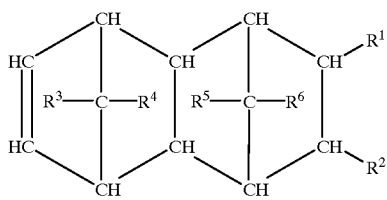
(III)

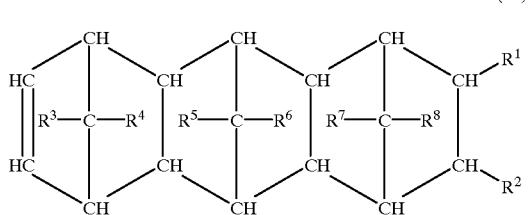
(IV)

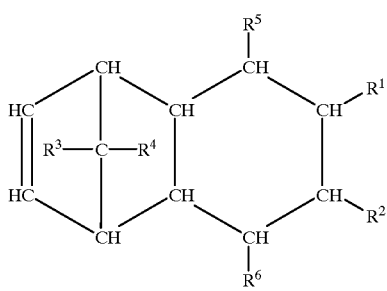
(V)

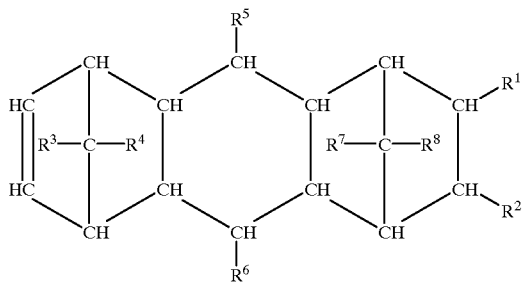
(VI)

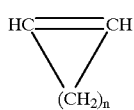
(VII)

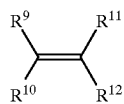
(VII)

Preferable COCs are copolymers of a cyclic olefin having a norbornene based structure, preferably norbornene, tetracyclododecene or cyclic olefins having a structure derived from them, and a non-cyclic olefin having a terminal double bond, e.g., an α-olefin, preferably ethylene or propylene. Among them, norbornene-ethylene, norbornene-propylene, tetracyclo-dodecene-ethylene and tetracyclododecene-propylene copolymers are particularly preferred.

Commercially available cycloolefin copolymers, e.g., those available under the trade mark "Topas" made by Hoechst Aktiengesellschaft, Germany, and the trade mark "APEL" made by Mitsui Petrochemical Industries, Ltd. can also be used in the present invention as the COC.

Preferably the COC suitable for the objects of the present invention has a viscosity number of 25 to 200 ml/g, especially 40 to 120 ml/g, more especially 40 to 80 ml/g, measured in decalin at 135° C. If the viscosity number is less than 25 ml/g, the rigidity of molded articles obtained from the resin compositions is insufficient, and if the viscosity number is more than 200 ml/g, the molding processability of the resin compositions tend to lower.

An aromatic vinyl-isobutylene copolymer (B1) and an aromatic vinyl-conjugated diene copolymer (B2) are used in the present invention as the rubber-like polymer (B) to be incorporated into the cycloolefin copolymer (A). These may be used alone or in admixture thereof. Examples of the aromatic vinyl compound are, for instance, styrene, α-methylstyrene, p-methylstyrene, chlorostyrene, bromostyrene, vinyl naphthalene, and the like.

Examples of the aromatic vinyl-isobutylene copolymer (B1) are, for instance, styrene-isobutylene block copolymer (SIB), styrene-isobutylene-styrene block copolymer (SIBS), isobutylene-styrene-isobutylene block copolymer (IBSIB), styrene-isobutylene random copolymer, and the like. These may be used alone or in admixture thereof. Among them, styrene-isobutylene block copolymer and styrene-isobutylene-styrene block copolymer are particularly preferred. These aromatic vinyl-isobutylene copolymers can be used alone if the difference in refractive index between the copolymer (B) and the COC (A) at 20° C. is not more than 0.015. A mixture of at least two aromatic vinyl-isobutylene copolymers can also be used if the difference in refractive index between the mixture and the component (A) at 20° C. is not more than 0.015. If the difference in refractive index is more than 0.015, no cycloolefin copolymer resin composition having an excellent transparency is obtained.

In the styrene-isobutylene copolymers, it is preferable from the viewpoint of rubber elasticity of the copolymers that the isobutylene/styrene ratio is from 40/60 to 99/1 by mole. In case of the styrene-isobutylene block copolymers, from the viewpoint of rubber elasticity and handling thereof it is preferable that the degree of polymerization of each block is from about 100 to about 150,000 for isobutylene (the copolymers may be in the liquid state if the degree of polymerization is less than about 100) and is from about 10 to about 30,000 for styrene.

The styrene-isobutylene copolymers can be obtained by known polymerization methods for general vinyl compounds, for example, by a living cationic polymerization method. For example, the copolymers can be prepared by a method as disclosed in Japanese Patent Publications Kokai No. 62-48704 and No. 64-62308 wherein it is disclosed that a living cationic polymerization of isobutylene or the like and a vinyl compound is possible, and polyisobutylene based block copolymers can be prepared by using the vinyl compound with isobutylene and other compounds. Besides, U.S. Pat. No. 4,946,899, U.S. Pat. No. 5,219,948 and Japanese Patent Publication Kokai No. 3-174403 disclose methods of the preparation of polymers of vinyl compounds by living cationic polymerization.

Since an isobutylene polymer has no double bond in its molecule, it has a higher stability against ultraviolet ray as compared with polymers having double bond in the molecule thereof, e.g., polybutadiene and, therefore, the weatherability thereof is good. Further, according to Willy, Polymer Handbook, 1989, the refractive index (nD) of the isobutylene homopolymer is 1.506 although it is a saturated elastomer having no bouble bond in its molecule. Such a refractive index is significantly high as compared with other saturated elastomers, e.g., ethylene-butene copolymer.

Therefore, styrene-isobutylene copolymers having a refractive index matched with that of the cycloolefin copolymer (A) which for example has a refractive index of 1.525 to 1.550, are excellent in weatherability as compared with unsaturated elastomers such as styrene-butadiene copolymer. In addition, they are excellent in strength, since the styrene content can be decreased as compared with other saturated elastomers such as styrene-ethylene-butene copolymer and hydrogenated styrene-conjugated diene copolymers and, therefore, since the content of a rubber component effective for improvement of strength can be increased as compared with styrene-ethylene-butene copolymer and hydrogenated styrene-conjugated diene copolymers.

Examples of the aromatic vinyl-conjugated diene copolymer (B2) are, for instance, styrene-butadiene block copolymer (SB), styrene-butadiene-styrene block copolymer (SBS), styrene-butadiene random copolymer (SBR), styrene-isoprene block copolymer (SI), styrene-isoprene-styrene block copolymer (SIS), styrene-isoprene random copolymer (SIR), and the like. These may be used alone or in admixture thereof. The aromatic vinyl-conjugated diene copolymers (B2) can be used alone if the difference in refractive index between the copolymers (B2) and the COC (A) is not more than 0.015. A mixture of at least two aromatic vinyl-conjugated diene copolymers can also be used if the difference in refractive index between the mixture and the component (A) is not more than 0.015. If the difference in refractive index is more than 0.015, no cycloolefin copolymer resin composition having an excellent transparency is obtained.

In the styrene-butadiene copolymers, it is preferable from the viewpoint of rubber elasticity of the copolymers that the butadiene/styrene ratio is from 40/60 to 99/1 by mole. Preferably, from the viewpoints of rubber elasticity and control of the size of particles dispersed, the degree of polymerization of each block in the block copolymers is from about 100 to about 150,000 for butadiene and is from about 10 to about 30,000 for styrene.

In the styrene-isoprene copolymers, it is preferable from the viewpoint of rubber elasticity of the copolymers that the isoprene/styrene ratio is from 40/60 to 99/1 by mole. Preferably, from the viewpoints of rubber elasticity and control of the size of particles dispersed, the degree of polymerization of each block in the block copolymers is from about 100 to about 150,000 for isoprene and is from about 10 to about 30,000 for styrene.

It is preferable, from the viewpoint of rubber elasticity, that such styrene-conjugated diene copolymers have a number average molecular weight Mn of 10,000 to 500,000 measured by GPC (gel permeation chromatography, in chloroform solvent at 25° C., polystyrene standard).

The aromatic vinyl-conjugated diene copolymer (B2) is inferior in weatherability to the aromatic vinyl-isobutylene copolymer (B1), but is inexpensive. Therefore, in case that a weatherability is not particularly required, the copolymer (B2) can inexpensively provide a cycloolefin copolymer resin composition of the present invention having well-balanced transparency and impact resistance.

The aromatic vinyl-isobutylene copolymer (B1) and the aromatic vinyl-conjugated diene copolymer (B2) can be used in admixture thereof, so long as the difference in refractive index between the COC (A) and the mixture of the components (B1) and (B2) is not more than 0.015.

The rubber-like polymer (B) is used in an amount of 1 to 100 parts by weight per 100 parts by weight of the component (A). If the amount is less than 1 part by weight, the impact resistance is insufficient, and if the amount is more than 100 parts by weight, a balance between rigidity and impact resistance is deteriorated.

The rubber-like polymer (B) used in the present invention is required to have a particle size of 0.4 to 3 $\mu$m, preferably 0.4 to 2 $\mu$m, in the state of being dispersed in the COC (A). If the size of the particles dispersed is less than 0.4 $\mu$m, a sufficient impact resistance is not obtained, and if the size is more than 3 $\mu$m, the transparency that the COC originaly possesses is impaired, so a balance between strength and transparency is deteriorated.

The term "size of particles dispersed" or "dispersed particle size" of the rubber-like polymer (B) as used herein denotes a value of average particle size obtained by taking a TEM photograph (transmission electron microphotograph) of the particles observed by ultra thin cutting method, measuring the particle size converted to circle of the rubber-like polymer within the area of 40×25 $\mu$m, and calculating according to the following equation:

$$\text{Average particle size} = (\Sigma n_i D_i^4)/(\Sigma n_i D_i^3)$$

wherein $n_i$ is the number of rubber-like polymer particles having a circle-converted particle size $D_i$ ($\mu$m).

In the resin composition of the present invention, the dispersed particle size of the component (B) in the component (A) varies depending on a combination of the components (A) and (B) used. Even if different two combinations of components (A) and (B) are kneaded under the same conditions, there is a case that the dispersed particle size of the component (B) does not become the same, depending on combination of the components (A) and (B).

The dispersed particle size of the component (B) in the component (A) may also vary depending on the melt viscosities of the components (A) and (B) and the kneading condition of the components (A) and (B), or depending on condition of injection molding when the resin composition of the present invention is molded by injection molding.

If it is desired to decrease the dispersed particle size of the component (B) in the component (A) at the time of melt-kneading the components (A) and (B), it is achieved by increasing the shearing force for the melt-kneading. The increase of the shearing force can be realized, for instance, by lowering the melt-kneading temperature as low as possible within the kneadable range, or by designing a screw for extrusion so as to raise the degree of kneading when kneading is conducted by means of a twin-screw extruder. Conversely, if it is desired to increase the dispersed particle size of the component (B) in the component (A), it is achieved by decreasing the shearing force for the melt-kneading. The decrease of the shearing force can be realized, for instance, by raising the melt-kneading temperature as high as possible within the kneadable range, or by designing a screw for extrusion so as to lower the degree of kneading when kneading is conducted by means of a twin-screw extruder.

In order to disperse the component (B) into the component (A) in the state of dispersed particle size of 0.4 to 3 $\mu$m in the resin composition of the present invention, the dispersed particle size of the component (B) in the kneaded product according to the present invention is investigated and then the kneading condition is set based thereon. The dispersed particle size of the component (B) can be adjusted to 0.4 to 3 $\mu$m by increasing the shearing force for the melt-kneading if the dispersed particle size is more than 3 $\mu$m, or by decreasing the shearing force if the dispersed particle size is less than 0.4 $\mu$m, whereby the desired cycloolefin copolymer resin composition of the present invention having well-balanced transparency and impact resistance.

In case of molding the resin composition of the present invention by a secondary processing such as injection molding, the dispersed particle size of the component (B) in the component (A) may also vary. For example, if the injection molding is carried out under such conditions that a large shearing force is applied to a melted resin composition, there is a case, depeding on combination of the components (A) and (B), that the dispersed particle size of the component (B) becomes lower than the dispersed particle size obtained at the time of melt-kneading a blend of the components (A) and (B) (at the time of primary processing).

Thus, as a result of an intensive study, it has been found that by selecting a combination of the components (A) and (B) so that the melt viscosities of the components (A) and (B) are as near as possible, control of the dispersed particle size by shearing force becomes easy and, moreover, the dispersed particle size of the component (B) once dispersed into the component (A) is hard to change at the time of secondary processing such as injection molding or the like. For example, it is preferable that the ratio of the melt index ($MI_{190}$, g/10 minutes) of the component (B) at 190° C. under a load of 2.16 kg to the melt index ($MI_{230}$, g/10 minutes) of the component (A) at 230° C. under a load of 2.16 kg, namely the $MI_{190}$ (B)/$MI_{230}$ (A) ratio, is not more than 0.7.

The cycloolefin copolymer resin composition of the present invention may further contain a polymer having a core-shell structure (C), for the purpose of improving the impact resistance without reducing a high transparency that the COC originally possesses.

The core-shell polymer (C) used in the present invention is composed of different two or more polymer layers (core and at least one shell). In the respective polymer layers which constitute the core-shell polymer, a layer containing as a main component a polymer having a low glass transition temperature is called rubber phase, and a layer containing as a main component a polymer having a high glass transition temperature is called hard phase. The rubber phase is crosslinked and, as occasion demands, the hard phase composed of at least one layer may be crosslinked and, therefore, even if the core-shell polymer is alloyed with the COC, the size and shape thereof do not vary. This is important in improving the strength without reducing the transparency of COC.

The rubber phase may be a homogeneous structure composed of at least one polymer or may be a heterogeneous structure composed of at least two polymers like so-called salami structure (occulusion structure). In case of the salami structure, the rubber phase may be composed of a polymer having a low glass transition temperature and a polymer having a high glass transition temperature or may be composed of at least two different polymers having a low glass transition temperature.

From the viewpoint of rubber elasticity at a temperature at which the resin composition of the present invention is used, it is preferable that the glass transition temperature (Tg) of the polymer having a low glass transition temperature which constitutes the rubber phase is less than 0° C., especially not more than –20° C., more especially not more than –30° C.

The content of the rubber phase in the core-shell polymer is preferably from 30 to 95% by weight, more preferably 40 to 90% by weight, further preferably 50 to 90% by weight. If the content of the rubber phase is less than 30% by weight, the effect of improving the impact resistance is small, and if the content is more than 95% by weight, the workability at coagulation of a latex in the preparation of the core-shell polymer tends to lower.

Homopolymers and copolymers derived from conjugated diene monomers, (meth)acrylate monomers, olefin monomers and aromatic vinyl monomers can be used as the polymer having a low glass transition temperature which constitutes the rubber phase. These polymers may be suitably combined to form the rubber phase.

Examples of the conjugated diene monomers used in the rubber phase are, for instance, butadiene, isoprene and chloroprene. Examples of the (meth)acrylate monomers are, for instance, butyl acrylate, 2-ethylhexyl acrylate, lauryl methacrylate and benzyl methacrylate. Examples of the olefin monomers are, for instance, ethylene, propylene, butene and isobutylene. Examples of the aromatic vinyl monomers are, for instance, styrene, α-methylstyrene, an alkylstyrene and a halogenated styrene. These monomers may be used alone or in admixture thereof. (Meth) acrylonitrile and substituted acrylonitriles may also be usable.

Polymers having an organopolysiloxane structure as represented by the formula (IX):

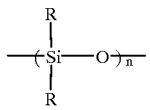

(IX)

wherein groups R are the same or different and each is an alkyl group having 1 to 10 carbon atoms, an alkenyl group, an aryl group or a substituted hydrocarbon group, can also be used as the constituting component of the rubber phase of the core-shell polymer. The alkyl group and the alkenyl group may be linear, branched or cyclic. These polymers can be obtained, for instance, by ring-opening polymerization of a cyclic siloxane.

In case of the rubber phase having a salami structure, it is also possible to combine at least two of polymers capable of forming the rubber phase, or to combine at least one of polymers having a low glass transition temperature which can form the rubber phase with a component corresponding to the hard phase.

The rubber phase is crosslinked and, therefore, contains a polyfunctional compound as a crosslinking agent. Polyfunctional unsaturated compounds as disclosed in U.S. Pat. No. 3,787,522 can be used as the polyfunctional compound. Examples of the polyfunctional compound are, for instance, allyl methacrylate, divinyl benzene, 1,3-butanediol methacrylate, γ-trimethoxysilylpropyl methacrylate, and other known crosslinking monomers. These may be used alone or in admixture thereof.

The glass transition temperature (Tg) of the polymers having a high glass transition temperature which constitute the hard phase is preferably not less than 0° C., more preferably not less than 20° C., further preferably not less than 50° C., from the viewpoint of distinction from the rubber phase.

The content of the hard phase in the core-shell polymer is preferably from 5 to 70% by weight, more preferably 10 to 60% by weight, further preferably 10 to % by weight. If the content of the hard phase is less than 5% by weight, the latex coagulability in the preparation of the core-shell copolymer tends to lower, and if the content is more than 70% by weight, there is a case that the effect of improving the impact resistance is not found.

Homopolymers and copolymers derived from (meth) acrylate monomers, aromatic vinyl monomers and olefin monomers can be used as the hard phase. These polymers may be suitably combined to form the hard phase.

Examples of the (meth)acrylate monomers used in the hard phase are, for instance, methyl methacrylate, cyclohexyl methacrylate and isobornyl methacrylate. Examples of the aromatic vinyl monomers are, for instance, styrene, α-methylstyrene and halogenated styrene. Examples of the olefin monomers are, for instance, ethylene, propylene, butene, isobutylene, vinyl norbornene and norbornene. These monomers may be used alone or in admixture thereof. (Meth)acrylonitrile and substituted acrylonitrile may also be usable.

The hard phase may be crosslinked and, therefore, may contain a polyfunctional compound as a crosslinking agent. Polyfunctional unsaturated compounds as disclosed in U.S. Pat. No. 3,787,522 can be used as the polyfunctional compound. Examples of the polyfunctional compound are, for instance, allyl methacrylate, divinyl benzene, 1,3-butanediol methacrylate, (γ-trimethoxysilyl)propyl methacrylate, and other known crosslinking monomers. These may be used alone or in admixture thereof.

Process for the preparation of the core-shell polymers is well known. In general, emulsion polymerization is utilized. For introduction of components incapable of subjecting to emulsion polymerization into the core-shell polymers, for example, micro-suspension polymerization can be utilized. Combined process of them is also available and, for example, core-shell polymers can be prepared by subjecting constituent components of the rubber phase, which are difficult to undergo an emulsion polymerization, to a micro-suspension polymerization and then effecting an emulsion polymerization to give a rubber phase and/or a hard phase.

The process for preparing the core-shell polymers is disclosed in detail, for example, in U.S. Pat. No. 3,833,682 and U.S. Pat. No. 3,787,522. The micro-suspension polymerization is disclosed, for example, in U.S. Pat. No. 4,113,687 and U.S. Pat. No. 4,177,177.

The core-shell polymer (C) used in the present invention is required to be that, as required for the component (B), the difference in refractive index between the component (C) and the COC (A) is at most 0.015, preferably at most 0.007, and the particle size of the primary particles thereof is from 0.1 to 1.0 μm, preferably 0.1 to 0.6 μm. Core-shell polymers having a volume average refractive index of 1.520 to 1.545 are preferred, and those having a volume average refractive index of 1.525 to 1.540 are particularly preferred.

The refractive index of the core-shell polymer can be practically measured after processing it into a sheet or the like, but can also be obtained by calculation. That is to say, if the refractive indexes at 20° C. of homopolymers of the monomers which are respective components constituting the core-shell polymer are known, the refractive index of the core-shell polymer can be obtained according to the following equation:

Refractive index of core-shell polymer: $nD = \Sigma(nDi \times xi)$ wherein xi is a weight fraction of a constitutive component i of the core-shell polymer per 100 parts by weight of the core-shell polymer, and nDi is the refractive index of the constitutive component i at 20° C. and 589 nm.

Refractive indexes (nD) of various homopolymers are described in Polymer Handbook, Willy, 1989, and the refractive indexes (nD) of the core-shell polymers (C) can be expected therefrom by calculation.

The core-shell polymer is used in an amount of 1 to 80 parts by weight per 100 parts by weight of the component (A). If the amount is less than 1 part by weight, the effect to be obtained by incorporation of the component (C) is insufficient, and if the amount is more than 80 parts by weight, no balanced rigidity and impact resistance are obtained.

The cycloolefin copolymer resin compositions of the present invention may be those obtained by subjecting the components (A) and (B) or the components (A), (B) and (C) to a radical reaction in the presence of an organic peroxide and optionally a radical-polymerizable polyfunctional monomer.

The organic peroxide used in the present invention includes, for instance, hydroperoxide compounds, dialkyl peroxide compounds, diacyl peroxide compounds, peroxyester compounds, peroxycarbonate compounds, ketone peroxide compounds, peroxyketal compounds and azo compounds. These peroxides may be used alone or in admixture thereof.

An example of the hydroperoxide compounds is, for instance, cumene hydroperoxide. An example of the dialkyl peroxide compounds is, for instance, di-tert-butyl hydroperoxide. An example of the diacyl peroxide compounds is, for instance, benzoyl peroxide. An example of the peroxyester compounds is, for instance, tert-butyl peroxybenzoate. An example of the peroxycarbonate compounds is, for instance, bis(4-tert-butylcyclohexyl) peroxydicarbonate. An example of the ketone peroxide compounds is, for instance, cyclohexanone peroxide. An example of the peroxyketal compounds is, for instance, 1,1-bis(tert-butylperoxy) cyclohexane. An example of the azo compounds is, for instance, azobisisobutyronitrile (AIBN).

Examples of the radical-polymerizable polyfunctional monomer which may be optionally used are, for instance, divinyl benzene, allyl methacrylate, diallyl phthalate, 1,3-butanediol dimethacrylate, and other compounds known as a crosslinking monomer. These may be used alone or in admixture thereof.

The organic peroxide is used in an amount of 0.0001 to 6 parts by weight, preferably 0.0001 to 3 parts by weight, more preferably 0.0005 to 1 part by weight, per 100 parts by weight of the cycloolefin copolymer (A). If the amount of the peroxide is less than 0.0001 part by weight, often the effect produced by a radical reaction is not sufficiently found, and if the amount is more than 6 parts by weight, there is a possibility that the radical reaction proceeds too much to result in difficulty in kneading the composition In case of subjecting the components (A) and (B) or the components (A), (B) and (C), which constitute the resin composition of the present invention, to a radical reaction in the presence of the organic peroxide (D) and optionally the radical-polymerizable polyfunctional monomer, it is preferable that after mixing the cycloolefin copolymer (A) with either or both of the components (B) and (C), the radical reaction is carried out in the presence of the organic peroxide and optionally the radical-polymerizable polyfunctional monomer.

Mixing of components (A) and (B) and optionally component (C) can be carried out, for instance, by mechanically kneading the separately prepared above components in an extruder or mixing in a usual mixer or kneader.

To the thus obtained mixture of the components (A) and (B) or the components (A), (B) and (C) were added the organic peroxide and optionally the radical-polymerizable polyfunctional monomer, and the mixture is subjected to a radical reaction at a temperature at which the organic peroxide can be decomposed enough.

Such a radical reaction can also be effected by adding the organic peroxide and optionally radical-polymerizable polyfunctional monomer to a molten mixture of the components (A) and (B) or the components (A), (B) and (C). The resin composition of the present invention can also be obtained in such a manner that the organic peroxide and optionally radical-polymerizable polyfunctional monomer may be added in the form of a solution in a suitable solvent to the above molten mixture at an organic peroxide-docomposable temperature, or a solid or molten mixture of the organic peroxide and optionally radical-polymerizable polyfunctional monomer with at least one of the components (B) and (C) is added to the molten component (A).

In the kneading of the above components, the organic peroxide may be added before the kneading, may be added after the kneading and then further kneaded, or may be added to a molten composition during the kneading. The components which constitute the resin composition are kneaded in the presence of the organic peroxide at a temperature of 180 to 300° C., preferably 180 to 280° C., preferably for 10 seconds to 10 minutes, more preferably 10 seconds to 3 minutes.

It is presumed that resin compositions having well-balanced transparency and impact resistance are obtained for the reasons that if the components (A) and (B) or the components (A), (B) and (C) are subjected to a radical reaction in such a manner, the organic peroxide is decomposed to produce radicals and a radical reaction occurs, thus the components (A) and (B) or the components (A) and (C) partially react to produce bonds between them, and/or a self-crosslinking reaction of the component (B) proceeds whereby the component (B) are present as cross-linked particles in the state of being dispersed in the component (A).

In case that the radical-polymerizable polyfunctional monomer is further present, resin compositions having a further improved balance between transparency and impact strength may be obtained since the crosslinking reaction becomes more easy to proceed.

The cycloolefin copolymer resin composition of the present invention may be used alone or in the form of a masterbatch wherein the composition is blended with other cycloolefins.

The cycloolefin copolymer resin composition of the present invention may contain usual one or more additives within the ranges conventionally used, e.g., plasticizer, ultraviolet absorber, thermal stabilizer, antioxidant, antistatic agent, and the like.

The cycloolefin copolymer resin composition of the present invention can be molded by known methods. For example, using single screw extruder, twin screw extruder, twin conical screw extruder, Brabender, injection molding machine and the like, the composition can be processed into molded articles, sheets, films and the like by press molding, extrusion, injection molding, blow molding, inflation molding and the like.

The molded articles obtained from the cycloolefin copolymer resin composition of the present invention have a notched Izod impact strength of 2.5 to 100 kg.cm/cm, especially 4 to 100 kg.cm/cm, more especially 5 to 100 kg.cm/cm, and a total light transmission of 80 to 90%, especially 85 to 90%, more especially 87 to 90%.

The cycloolefin copolymer resin composition of the present invention is suitable as bottles, cups, medical materials (e.g., blister package and film for packaging drugs), extrusion films (e.g., film for packing), films for packaging foods and toys, and the like.

Examples of the present invention are shown below. It is to be understood, however, that the Examples are for purpose of illustration only and the present invention is not limited thereto. In the following description, all % and parts are by weight unless otherwise noted.

Measurement and evaluation of physical properties of compositions were made by the following methods.

(A) PREPARATION METHOD AND TESTING METHOD OF COMPOSITIONS

After dry-blending predetermined amounts of raw materials, the resulting mixture was melt-kneaded by a twin-screw extruder (TEX-30HSS made by The Japan Steel Works, Ltd.) and pelletized. The pellets were injection-molded (using IS80EPN made by Toshiba Machine Co., Ltd. and a specified mold) at a nozzle temperature of 250° C. and an injection pressure of primary/secondary=1000/800 kg/cm$^2$ to give test specimens.

(1) Izod Impact Strength (notched)

Evaluated according to JIS K 7110. The specimens were prepared by injection molding to have a size of 10 mm in width and 6 mm in thickness.

(2) Transparency (Total light transmission and haze)

Using flat plate specimens having a thickness of 3 mm prepared by press molding at 200° C., total light transmission (Tt %) and haze were measured at 23° C. according to JIS K 7105 by NDH-Σ180 made by Nippon Denshoku Kabushiki Kaisha (3) Dispersed Particle Size With respect to the test specimens for Izod impact strength prepared by injection molding, the section thereof vertical to the direction of the resin flow was observed by TEM.

(4) Refractive Index

The refractive index of a sheet was measured at 20° C. by an Abbe's refractometer 3T (D line, 589 nm) made by Kabushiki Kaisha Atago.

(5) Primary Particle Size of Core-shell Polymer

The size of particles in the state of a latex was measured at 20° C. by a submicron size distribution analyzer Nicomp Model 370HPL made by Nozaki Sangyo Kabushiki Kaisha (B) RAW MATERIALS USED IN EXAMPLES AND COMPARATIVE EXAMPLES As the COC (A) was used Topas 6013 (registered trade mark) made by Hoechst AG (Germany). The refractive index (nD) thereof actually measured with respect to a sheet having a thickness of 3 mm was 1.535 (value described in the brochure therefor 1.53).

As the rubber-like polymer (B) were used the following block copolymers.

B-1 (styrene-isobutylene-styrene block copolymer, SIBS, synthesized by the following method)

The above SIBS triblock copolymer B-1 was synthesized according to a known method. A method for the production of SIBS triblock copolymer is known, and it can be obtained, for example, by a method as disclosed in U.S. Pat. No. 4,964,899, Japanese Patent Publication Kokai No. 7-207098, Journal of Molecular Science: Pure and Applied Chemistry, Vol. A 31, 2055(1994), Japanese Patent Publication Kokai No. 7-100763, or Japanese Patent Publication Kokoku No. 7-59601. The SIBS triblock copolymer B-1 was synthesized according to the method disclosed in Japanese Patent Publication Kokai No. 9-87439 except that 1,4-bis (2-chloro-2-propyl)benzene, isobutylene and styrene were used in amounts of 0.2 parts, 66 parts and 34 parts. The thus synthesized SIBS triblock copolymer B-1 had a number average molecular weight Mn of 109,000, an Mw/Mn ratio of 1.2 (values measured by gel permeation chromatography in tetrahydrofuran solvent at 23° C.), a content of polystyrene block of 31% and a refractive index (nD) of 1.531.

CRATON D-KX405 (made by Shell Chemical Company, SBS), refractive index (nD)=1.534

ASAPRENE T430 (made by Asahi Chemical Industry Co., Ltd.,

SBS), refractive index (nD)=1.542

CRATON G1650 (made by Shell Chemical Company, SEBS), refractive index (nD)=1.506

The refractive index of the block copolymers was measured at 20° C. by an Abbe's refractometer (D line, 589 mn).

As the core-shell polymer (C) was used one synthesized in the following manner.

(1) An autoclave flushed with nitrogen was charged with the raw materials according to the following recipe, and the reaction was carried out at 60° C. for 20 hours with stirring.

| Butadiene | 76 parts |
| --- | --- |
| Styrene | 24 parts |
| Divinyl benzene | 1 part |
| Diisopropylbenzene hydroperoxide | 0.3 part |
| Ethylenediamine tetraacetate | 0.006 part |
| Iron(I) sulfate heptahydrate | 0.002 part |
| Formaldehyde sodium sulfoxylate | 0.3 part |
| Potassium oleate | 2.0 part |
| Pure water | 220 parts |

The conversion of that reaction was 98%, and a latex of a styrene-butadiene rubber having an average particle size of 0.09 μm was obtained.

(2) An autoclave was charged with the rubber latex obtained in (1), flushed with nitrogen and was further charged with raw materials according to the following recipe. The reaction was carried out at 60° C. for 24 hours with stirring.

| Styrene-butadiene latex having an average particle size of 0.09 μm obtained in (1) (solid basis) | 30 parts |
| --- | --- |
| Butadiene | 53.2 parts |
| Styrene | 16.8 parts |
| Divinyl benzene | 0.1 part |
| Diisopropylbenzene hydroperoxide | 0.15 part |
| Ethylenediamine tetraacetate | 0.006 part |
| Iron(I) sulfate heptahydrate | 0.002 part |
| Formaldehyde sodium sulfoxylate | 0.2 part |
| Potassium oleate | 1.0 part |
| Pure water | 130 parts |

After 7 and 14 hours from starting the reaction, 0.5 part of potassium oleate was added for each time, and after 10 and 16 hours, 0.1 part of diisopropylbenzene hydroperoxide and 0.1 part of formaldehyde sodium sulfoxylate were added for each time.

The conversion of that reaction was 96%, and a latex of a styrene-butadiene rubber having an average particle size of 0.13 μm was obtained.

(3) An autoclave was charged with the rubber latex obtained in (2), flushed with nitrogen and was further charged with raw materials according to the following recipe. The reaction was carried out at 60° C. for 30 hours with stirring.

| Styrene-butadiene latex having an average particle size of 0.13 μm obtained in (2) (solid basis) | 30 parts |
| --- | --- |
| Butadiene | 53.2 parts |
| Styrene | 16.8 parts |
| Divinyl benzene | 0.1 part |
| Diisopropylbenzene hydroperoxide | 0.15 part |
| Ethylenediamine tetraacetate | 0.006 part |
| Iron(I) sulfate heptahydrate | 0.002 part |
| Formaldehyde sodium sulfoxylate | 0.2 part |
| Potassium oleate | 1.0 part |
| Pure water | 130 parts |

After 7 and 14 hours from starting the reaction, 0.2 part of potassium oleate was added for each time, and after 10, 16 and 24 hours, 0.1 part of diisopropylbenzene hyproper oxide and 0.1 part of formaldehyde sodium sulfoxylate were added for each time.

The conversion of that reaction was 95%, and a latex of a styrene-butadiene rubber having an average particle size of 0.20 μm was obtained.

Thus, there was obtained a latex of a styrene-butadiene rubber having an average particle size of 0.20 μm and containing 24% of styrene and 76% of butadiene.

The particle size distribution of this latex was measured by a submicron size distribution analyzer Nicomp Model 370HPL made by Nozaki Sangyo Kabushiki Kaisha, and it was found that particles having a size of less than 0.1 μm and having a size of more than 0.5 μm were not present.

(4) The styrene-butadiene rubber latex obtained in (3) was charged in a glass vessel according to the following recipe and stirred at 70° C.

| Styrene-butadiene latex having an average particle size of 0.20 μm obtained in (3) (solid basis) | 70 parts |
| --- | --- |
| Potassium persulfate | 0.15 part |
| Pure water | 70 parts |

To the mixture were continuously added the following monomers over 3 hours in a nitrogen stream to conduct a reaction

| Cyclohexyl methacrylate | 23 parts |
| --- | --- |
| Styrene | 7 parts |

After the completion of the addition, 0.2 part of potassium persulfate was added and the mixture was further stirred for 2 hours to give a latex of a core-shell polymer. The conversion after the reaction was 98%, and the average particle size of the obtained polymer was 0.22 μm.

The particle size distribution of this latex was measured by a submicron size distribution analyzer Nicomp Model 370HPL made by Nozaki Sangyo Kabushiki Kaisha, and it was found that particles having a size of less than 0.1 μm and having a size of more than 0.5 μm were not present.

To the obtained latex of the core-shell polymer (C) were added 1 part of 2,6-di-tert-butyl-p-cresol and 1 part of dilaurylthiodipropionate. After thoroughly stirring, an aqueous hydrochloric acid solution was added to the latex to coagulate it, and the resulting slurry was adjusted to pH 3 to 4, dehydrated and dried to give a core-shell polymer (M-1) to be used as the component (C) of the composition of the present invention. The refractive index of the core-shell polymer (M-1) was 1.531.

EXAMPLES 1 to 5

The components (A) and (B) or the components (A), (B) and (C) were dry-blended according to the recipe shown in Table 1, and the resulting mixture was melt-kneaded in a twin-screw extruder and pelletized to give a resin composition The recipe, the dispersed particle size of block copolymer and the results of measurement of properties are shown in Table 1.

TABLE 1

| | (A) COC | | (B) Block copolymer | | (C) Core-shell polymer | | Difference in | |
|---|---|---|---|---|---|---|---|---|
| | Kind (Amount) | Refractive index (nD) | Kind (Amount) | Refractive index (nD) | Kind (Amount) | Refractive index (nD) | nD between (A) and (B) | Dispersed particle size of (B) ($\mu$m) |
| Example 1 | 6013 (90%) | 1.535 | B-1 (10%) | 1.533 | — | — | 0.002 | 0.5 |
| Example 2 | 6013 (90%) | 1.535 | ASAPRENE T430 (10%) | 1.542 | — | — | 0.007 | 1 |
| Example 3 | 6013 (80%) | 1.535 | CRATON D-KX405 (20%) | 1.534 | — | — | 0.001 | 1.5 |
| Example 4 | 6013 (80%) | 1.535 | B-1 (3%) | 1.533 | M-1 (17%) | 1.531 | 0.002 | 0.4 |
| Example 5 | 6013 (80%) | 1.535 | ASAPRENE T430 (3%) | 1.542 | M-1 (17%) | 1.531 | 0.007 | 1 |

| | Difference in nD between (A) and (C) | Size of primary particle of (C) ($\mu$m) | Impact strength kg·cm/cm | Light transmission (%) | Haze (%) |
|---|---|---|---|---|---|
| Example 1 | — | — | 4.5 | 81 | 7 |
| Example 2 | — | — | 10 | 89 | 11 |
| Example 3 | — | — | 29 | 87 | 13 |
| Example 4 | 0.004 | 0.22 | 4 | 89 | 7 |
| Example 5 | 0.004 | 0.22 | 7 | 88 | 9 |

COMPARATIVE EXAMPLES 1 to 4

The components (A) and (B) were dry-blended according to the recipe shown in Table 2, and the resulting mixture was melt-kneaded in a twin-screw extruder and pelletized to give a resin composition. The recipe, the dispersed particle size of block copolymer and the results of measurement of properties are shown in Table 2. The composition of Comparative Example 4 is composed of only component (A).

From Comparative Example 1, it is found that if the dispersed particle size of an aromatic vinyl-conjugated diene copolymer used as the component (B) is less than 0.4 $\mu$m, a sufficient Izod impact strength is not obtained. From Comparative Examples 2 and 3, it is found that if the difference in refractive index between the COC (A) and the block copolymer (B) is more than 0.015, a sufficient transparency is not obtained.

INDUSTRIAL APPLICABILITY

The cycloolefin copolymer resin compositions of the present invention have an excellent impact resistance improved without impairing an excellent transparency that cycloolefin copolymers themseleves possess, and are useful for various purposes, e.g., containers such as bottles and cups, and packaging films.

What is claimed is:
1. A transparent cycloolefin copolymer resin composition comprising:
(A) a cycloolefin copolymer and (B) 1 to 100 parts by weight, per 100 parts by weight of said cycloolefin copolymer, of at least one rubber-like polymer selected from the group consisting of (B1) an aromatic vinyl-isobutylene copolymer and (B2) an aromatic vinyl-conjugated diene copolymer. wherein the difference in refractive index (nD) at 20° C. between the components (A) and (B) is at most 0.015 and the particle size of the component (B) dispersed in the component (A) is from 0.4 to 3 $\mu$m; and

1 to 80 parts by weight of a core-shell polymer (C) per 100 parts by weight of the component (A), wherein the difference in refractive index (nD) at 20° C. between the components (A) and (C) is at most 0.015 and the primary particle size of the component (C) is from 0.1 to 1.0 $\mu$m.

2. The resin composition of claim 1, wherein said cycloolefin copolymer (A) contains 1 to 99% by weight of structural units of at least one cycloolefin, 99 to 1% by weight of structural units of at least one non-cyclic olefin

TABLE 2

| | (A) COC | | (B) Block copolymer | | Difference in nD between (A) and (B) | Dispersed particle size of (B) ($\mu$m) | Impact strength kg·cm/cm | Light transmission (%) | Haze (%) |
|---|---|---|---|---|---|---|---|---|---|
| | Kind (Amount) | Refractive index (nD) | Kind (Amount) | Refractive index (nD) | | | | | |
| Com. Ex. 1 | 6013 (80%) | 1.535 | CRATON D-KX405 (20%) | 1.534 | 0.001 | 0.3 | 3 | 88 | 7 |
| Com. Ex. 2 | 6013 (80%) | 1.535 | CRATON G 1650 (20%) | 1.506 | 0.029 | 0.2 | 8 | 40 | 92 |
| Com. Ex. 3 | 6013 (80%) | 1.535 | CRATON G 1650 (20%) | 1.506 | 0.029 | 1.2 | 30 | 44 | 92 |
| Com. Ex. 4 | 6013 (100%) | 1.535 | — | — | — | — | 3 | 90 | 3 | and 0 to 20% by weight of structural units of other vinyl compounds having at least one double bond.

3. The resin composition of claim 2, wherein said cycloolefin copolymer (A) contains 40 to 90% by weight of structural units of at least one cycloolefin and 60 to 10% by weight of structural units of at least one non-cyclic olefin.

4. The resin composition of any of claim 1, wherein said aromatic vinyl-isobutylene copolymer (B1) is at least one copolymer containing at least 40% by weight of isobutylene units selected from the group consisting of styrene-isobutylene block copolymer (SIB), styrene-isobutylene-styrene block copolymer (SIBS), isobutylene-styrene-isobutylene block copolymer (IBSIB) and styrene-isobutylene random copolymer.

5. The resin composition of any of claim 1, wherein said aromatic vinyl-conjugated diene copolymer (B2) is at least one member selected from the group consisting of a styrene-butadiene copolymer containing at least 40% by weight of butadiene units and a styrene-isoprene copolymer containing at least 40% by weight of isoprene units, wherein said styrene-butadiene copolymer is at least one member selected from the group consisting of a styrene-butadiene block copolymer (SB), a styrene-butadiene-styrene block copolymer (SBS) and a styrene-butadiene random copolymer (SBR), and said styrene-isoprene copolymer is at least one member selected from the group consisting of a styrene-isoprene block copolymer (SI), a styrene-isoprene-styrene block copolymer (SIS) and a styrene-isoprene random copolymer (SIR).

6. A process for preparing a transparent cycloolefin copolymer resin composition which comprises kneading (A) a cycloolefin copolymer and (B) 1 to 100 parts by weight, per 100 parts by weight of said cycloolefin copolymer, of at least one rubber-like polymer selected from the group consisting of (B1) an aromatic vinyl-isobutylene copolymer and (B2) an aromatic vinyl-conjugated diene copolymer in the presence of (D) 0.0001 to 6 parts by weight, per 100 parts by weight of the component (A), of an organic peroxide at a temperature of 180 to 300° C.;

wherein the components (A) and (B) are kneaded together with 1 to 80 parts by weight of a core-chell polymer (C) per 100 parts by weight of the component (A).

7. A transparent cycloolefin copolymer resin composition comprising (A) a cycloolefin copolymer and (B) 1 to 100 parts by weight of an aromatic vinyl-isobutylene copolymer per 100 parts by weight of said cycloolefin copolymer, wherein the difference in refractive index (nD) at 20° C. between the components (A) and (B) is at most 0.015 and the particle size of the component (B) dispersed in the component (A) is from 0.4 to 3 μm.

8. The resin composition of claim 7, wherein said cycloolefin copolymer (A) contains 1 to 99% by weight of structural units of at least one cycloolefin, 99 to 1% by weight of structural units of at least one non-cyclic olefin and 0 to 20% by weight of structural units of other vinyl compounds having at least one double bond.

9. The resin composition of claim 7, wherein said cycloolefin copolymer (A) contains 40 to 90% by weight of structural units of at least one cycloolefin and 60 to 10% by weight of structural units of at least one non-cyclic olefin.

10. The resin composition of claim 7, wherein said aromatic vinyl-isobutylene copolymer (B) is at least one copolymer containing at least 40% by weight of isobutylene units selected from the group consisting of styrene-isobutylene block copolymer (SIB), styrene-isobutylene-styrene block copolymer (SIBS), isobutylene-styrene-isobutylene block copolymer (IBSIB) and styrene-isobutylene random copolymer.

* * * * *